Patented June 2, 1942

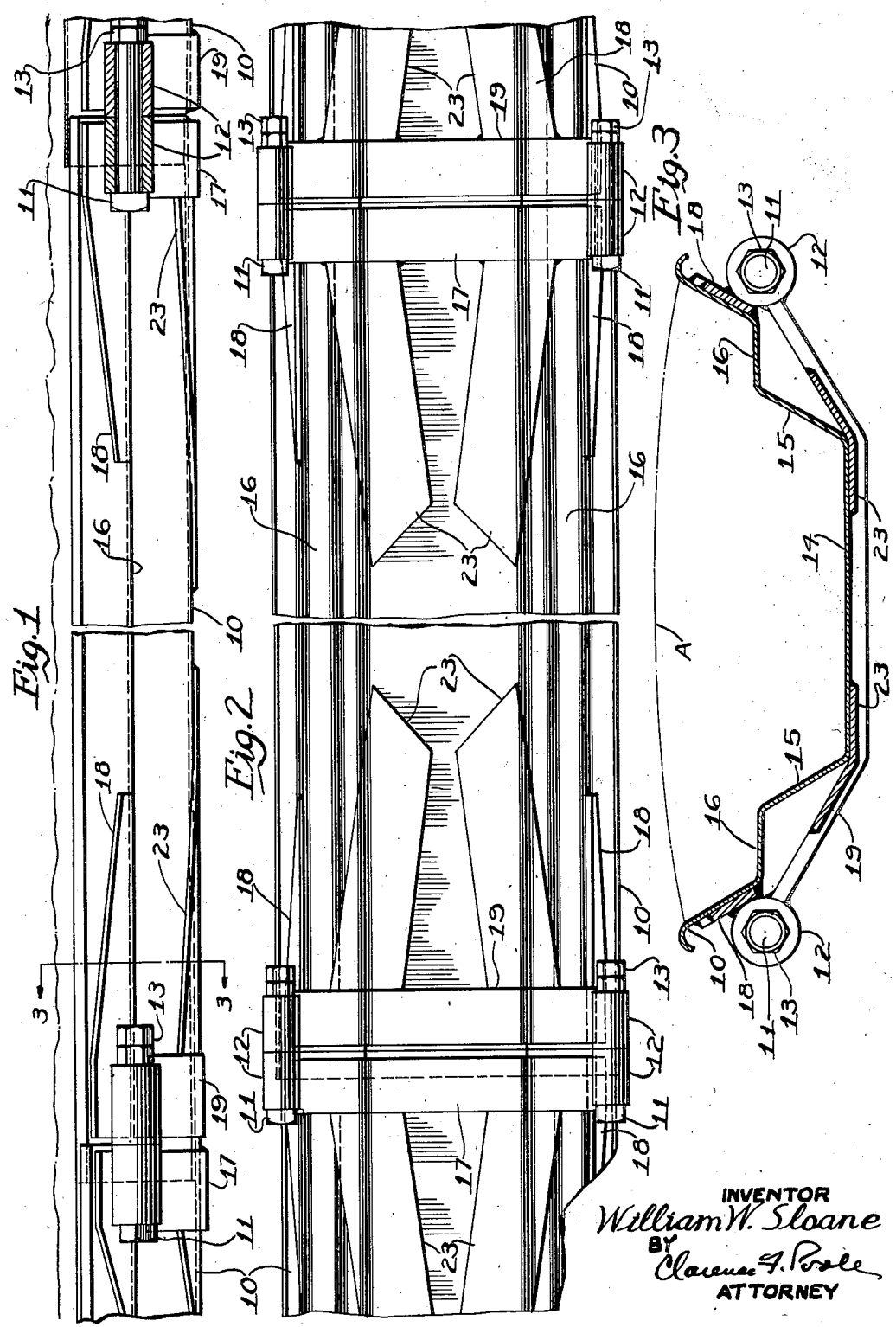

2,284,925

UNITED STATES PATENT OFFICE 2,284,925

SHAKER CONVEYER TROUGH CONNECTING MEANS

William W. Sloane, Chicago, Ill., assignor to Goodman Manufacturing Company, Chicago, Ill., a corporation of Illinois Application February 5, 1941, Serial No. 377,463

4 Claims. (Cl. 198—220)

This invention relates to improvements in shaker conveyer troughs and connecting means therefor.

Heretofore, the ends of adjacent reciprocating trough sections of a shaker conveyer have been connected together by various forms of connecting devices including abutting eyes with connecting bolts extending therethrough. These connecting devices have usually been on a level with or slightly below the bottom of the conveyer trough sections. In some cases the connection has been such as to provide a yieldable or movable connection between the trough sections, and in other cases it has been attempted to make the connection rigid. In both forms of connections, however, breakage of the connecting bolts or buckling and breakage of the trough sections has been quite common.

The objects of my present invention are to overcome these difficulties by providing a connecting means so arranged that it is approximately in alignment with the center of force of the conveyer trough sections, when loaded with an average load of material.

A further object of my invention is to provide a novel form of connecting means for connecting a plurality of conveyer trough sections together in end to end relationship including a pair of connecting eyes on each side of each end of each trough section and so arranged as to be intersected by a plane parallel to the conveyer trough section and extending substantially through the center of force of the conveyer trough sections.

A more specific object of my invention is to provide a new and improved form of conveyer trough section having connecting eyes on opposite ends thereof and disposed in approximate alignment with the center of force of the conveyer trough section, when loaded with an average load of material and having a supporting means for said eyes including reinforcing straps extending across the bottom of each trough section, adjacent opposite ends thereof, and extending laterally and angularly upwardly from said bottom and terminating into said eyes, together with a stiffening means extending from said reinforcing straps, longitudinally along each trough section towards the transverse center thereof and with said reinforcing straps and the sides and bottom of each trough section forming stiffening columns adjacent the opposite ends of each trough section.

Other objects of my invention will appear from time to time as the following specification proceeds and with reference to the accompanying drawing wherein:

Figure 1 is a fragmentary view in side elevation illustrating the connections of several troughs of a conveyer trough line;

Figure 2 is a bottom plan view drawn to a slightly reduced scale from Figure 1, illustrating the connections between several troughs of a shaker conveyer trough line; and Figure 3 is an enlarged transverse sectional view taken substantially along line 3—3 of Figure 1.

In the drawing a plurality of conveyer trough sections 10, 10, of a shaker conveyer trough line, are herein shown as being connected together in overlapping relation with respect to each other by means of connecting bolts 11, 11 extending through aligned abutting eyes 12, 12. Lock nuts 13, 13 are threaded on said bolts, to hold said eyes in abutting relation with respect to each other during reciprocation of the conveyer.

The trough sections 10, 10 have a horizontal bottom 14 and outwardly inclined flared sides 15, 15, having intermediate widened relatively horizontal shouldered portions 16, 16 formed thereon, substantially midway between the tops and bottoms of said side walls.

A reinforcing strap 17 extends transversely across the bottom of one trough section, adjacent one end thereof, and laterally beyond the bottom of said trough section in an upwardly inclined direction, across the recesses formed by the undersides of the shouldered portions 16, 16. Said strap terminates at its ends at the eyes 12, 12 and is secured to said eyes at its ends, forming a supporting means therefor. Said eyes are herein shown as being disposed above the bottom of said trough section and substantially in alignment with the shouldered portions thereof and as being secured to stiffening members 18, 18, extending longitudinally along opposite sides of the upper portions of the sides of said trough sections, towards the transverse center thereof.

A reinforcing strap 19, similar to the reinforcing strap 17, extends transversely across the bottom of the opposite end of said trough section and terminates into the connecting eyes 12, 12. Said strap, as herein shown, is spaced from the end of said trough section a distance sufficient to permit said end of said trough section to overlap the end of the next adjacent trough section. Said reinforcing straps are otherwise of the same form and construction as the reinforcing straps 17, 17. It is of course obvious that if it is desired to connect the trough sections in abutting relation with respect to each other, that the straps 17 and 19 may be placed adjacent opposite ends of each trough section.

Stiffening straps 23, 23 extend longitudinally along the bottoms of said trough sections from the reinforcing straps 17 and 19, in an angular direction towards the transverse center of each trough section. As herein shown, the stiffening straps 23, 23 are secured to the reinforcing straps 17 and 19 at one of their ends and extend upwardly along opposite sides of said reinforcing straps, for a portion of the length thereof, and are bent so the portion thereof secured to said strap conforms to the form of said strap. Said stiffening straps together with said reinforcing straps and the underside of the sides and bottom of said trough section form box-like reinforcing and stiffening columns at opposite sides of each end of each trough section, to prevent buckling thereof.

The connecting eyes 12, 12, being in substantially the same plane as the shouldered portions 16, 16 of each trough section, are also so arranged that their longitudinal centers are intersected by a plane parallel to the bottom of the trough section and extending substantially through the center of force of each trough section when loaded with an average load of material, such as coal, the upper extremities of this average load being indicated by broken line A.

It may be seen from the foregoing that the conveying force is transmitted from one trough section to the other in substantially the same plane as a horizontal plane extending substantially through the center of force of said trough section, when loaded with an average load of material. This provides a simplified form of connection, for connecting adjacent ends of the trough sections of a shaker conveyer together, so arranged that the forces transmitted from one connecting member to the other will be transmitted in the plane of the center of forces of each trough section of the conveyer, and reduces the tendency of the trough sections to twist or bend in a vertical direction and minimizes the breakage and buckling of the trough sections and of the connecting bolts, connecting said trough sections together.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In a shaker conveyer, a plurality of conveyer trough sections, means for connecting said trough sections together in such a manner as to prevent buckling or breaking thereof during reciprocation of the conveyer including reinforcing straps extending transversely across the bottoms and upwardly along opposite sides of said trough sections adjacent opposite ends thereof and terminating into connecting means at their ends, said connecting means of adjacent ends of said trough sections being adapted to abut and connecting members engaging said abutting connecting means for connecting said trough sections together, and said connecting means of each trough section being intersected by a plane parallel to the bottom of the trough section and extending substantially through the center of force of said trough section, and longitudinally extending stiffening straps extending from said reinforcing straps inwardly towards the center of said trough sections and with said reinforcing straps forming columns for stiffening the bottoms of said trough sections adjacent their ends.

2. In a shaker conveyer, a plurality of conveyer trough sections, each of said trough sections having a relatively flat bottom and inclined sides, said sides having intermediate widened shouldered portions substantially parallel to the bottoms of said trough sections, reinforcing straps extending transversely across and secured to the bottoms of said trough sections, adjacent opposite ends thereof and extending laterally and angularly upwardly therefrom across recesses formed in the outsides of said trough sections by said shouldered portions of said trough sections, said reinforcing straps with the sides of said trough sections forming reinforcing structures, for stiffening adjacent ends of said trough sections, and terminating into connecting means for connecting said trough sections together, said connecting means of each trough section being connected to the sides of said trough section above said recesses and intersected by a plane parallel to the bottom of each trough section and extending substantially through the center of force of said trough section when loaded with an average load of material, to prevent vertical bending movement of said trough sections with respect to each other during reciprocation of the conveyer.

3. In a shaker conveyer, a plurality of conveyer trough sections, each of said trough sections having a relatively flat bottom and inclined sides, said sides having intermediate widened shouldered portions disposed substantially parallel to the bottoms of said trough sections, reinforcing straps extending transversely across the bottoms of said trough sections, adjacent opposite ends thereof, and extending laterally and angularly upwardly therefrom across recesses formed in the outsides of said trough sections by said shouldered portions of said trough sections, and stiffening straps extending longitudinally from said reinforcing straps inwardly towards the centers of said trough sections, said stiffening straps being secured to said reinforcing straps and extending laterally along said reinforcing straps, beyond the bottoms of said trough sections, and angularly inwardly to the bottoms of said trough sections, to which they are secured, and said stiffening straps with the outsides of said trough sections and said reinforcing straps forming reinforcing columns at opposite ends of said trough sections.

4. In a shaker conveyer, a plurality of conveyer trough sections, each of said trough sections having a relatively flat bottom and inclined sides, said sides having intermediate widened shouldered portions disposed substantially parallel to the bottoms of said trough sections, reinforcing straps extending transversely across the bottoms of said trough sections adjacent opposite ends thereof and laterally and angularly upwardly therefrom across recesses formed in the outsides of said trough sections by said shouldered portions of said trough sections, and stiffening straps extending longitudinally from said reinforcing straps inwardly towards the centers of said trough sections, said stiffening straps being secured to said reinforcing straps and extending laterally along said reinforcing straps beyond the bottoms of said trough sections, and angularly inwardly and longitudinally towards the transverse centers of said trough sections towards the bottoms thereof, to which they are secured, said stiffening straps with the outsides of said trough sections and said reinforcing straps forming reinforcing columns at the ends of said trough sections, and said reinforcing straps terminating into connecting means, for connecting said trough sections together, said connecting means of each trough section being intersected by a plane parallel to the bottom of said trough section and extending substantially through the center of force of said trough sections when loaded with an average load of material, to prevent vertical bending movement of said trough sections with respect to each other during reciprocation of the conveyer.

WILLIAM W. SLOANE.